May 1, 1956 W. WOCKENFUSS 2,743,868
CARD SENSING MECHANISM
Filed April 8, 1953

INVENTOR.
WILLIAM WOCKENFUSS
BY
Jesse Bauer
ATTORNEY

United States Patent Office 2,743,868
Patented May 1, 1956

2,743,868
CARD SENSING MECHANISM

William Wockenfuss, Brooklyn, N. Y., assignor to Burroughs Corporation, a corporation of Michigan Application April 8, 1953, Serial No. 347,596

9 Claims. (Cl. 235—61.11)

The instant invention relates to sensing devices in machines which analyze the perforations in punched record cards or the like.

It is desirable in sensing devices of such types to provide as long a contact closure period as possible. This is to allow sufficient time for the operation of the associated mechanisms. With other sensing devices the contact closure period for sensing was generally limited or determined by the length of the perforation in the punched card. Attempts have been made, as in Brand et al., 2,475,307, to increase the contact closure period by permitting the sensing means to follow or move with the perforations in the moving punched cards. However, there too the contact closure period or sensing time is, in effect, limited by the length of the perforation and the time it takes for the perforation to pass through the sensing device.

The instant invention proposes a structure wherein a sensing element, upon encountering a perforation in a punched record card, drops therein to make or close a contact or circuit. However, the contact remains closed irrespective of the continued movement of the perforation past the sensing element and the corresponding movement of the sensing element out of the perforation.

Therefore, it is one of the main objects of the present invention to provide a sensing device which will increase the sensing time to a period greater than that permitted by a perforation in a punched card being fed under the usual sensing device.

A further important object of the invention is to provide a sensing device having a sensing element, which upon encountering a perforation in a record card, actuates mechanism to make a sensing circuit. The period of time that the sensing circuit remains being independent of the period of time it takes for the perforation to pass the sensing element.

Another important object is the provision of mechanism to positively break the sensing circuit and retain it inactive for any desired or any predetermined period of time.

Still a further object of the present invention is to provide a sensing device of improved design, one which is simple in operation and which may be utilized to perform any useful function.

The inventive idea involved is capable of receiving a variety of expressions one of which, for purposes of illustration, is shown in the accompanying drawings; but it is to be expressly undertood that said drawings are employed merely to facilitate the description of the invention as a whole and not to define the limits thereof, reference being had to the appended claims for this purpose.

Figure 1:
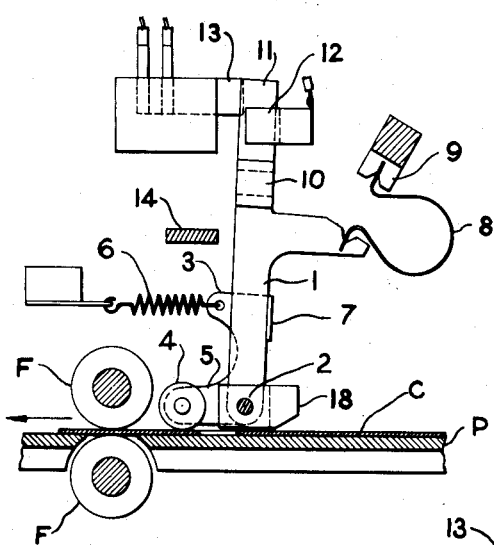
Fig. 1 is a side elevation of the novel sensing device with the sensing contacts out of engagement.

The sensing device consists of a holder 1 pivoted or oscillatable about a pivot rod 2. Also pivoted or oscillatable about the pivot rod 2 and adjacent to the holder 1 is a bell crank member or sensing member 3.

The lower end of the bell crank 3 supports or has attached thereto a rotating sensing roll 4 as by a pin passing through ears 5. The upper end of the crank 3 is yieldingly or resiliently urged by spring 6 for a purpose to be described later. On the bell crank 3 and spaced laterally from the spring is a limiting device shown in the form of an ear 7 which abuts the edge of the holder 1. The limiting device 7 limits the relative pivoting or relative amplitude of oscillation of the bell crank 3 and the holder 1.

The holder 1 has connected or attached thereto an over-the-center mechanism. In the instant device the over-the-center mechanism is shown in the form of a flat spring 8 although it will be obvious that almost any other toggle mechanism may be used. The spring 8 is of somewhat U shape as shown and is attached at its one end to the holder and anchored at its other end to anchoring means 9. The over-the-center mechanism or spring 8 has two basic operative positions. In the first position as seen in Fig. 1, the spring yieldingly urges and retains its connected holder in a clockwise direction. This causes the holder 1 to abut the limiting ear 7 and at the same time creates a slight yielding opposition to the resilient pull of the bell crank spring 6. In its second position (Figs. 2 and 3) it retains the holder and its associated contact in circuit making engagement until the holder and spring are caused by means, described later, to move to their first position.

Figure 4:
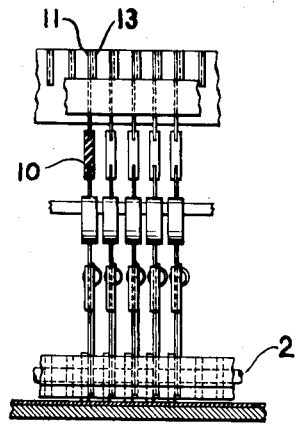
Fig. 4 is a view looking at Fig. 1 from the right showing the arrangement of the contacts.
Figure 5:
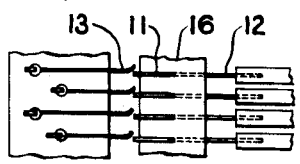
Fig. 5 is a top view wherein the sensing contacts shown in Fig. 4 are out of contact.

On the holder and connected to it by insulating means 10 is the first contact element 11 in a group of three metalic contacts. The second contact element 12 is in constant wiping engagement with the contact 11 as is shown in Fig. 4 while the third contact element 13 completes the sensing circuit when the first contact becomes simultaneously engaged with both the second and third contacts 12 and 13 respectively. As seen in Figs. 1 and 5, the metalic contacts 12 and 13 are held in insulating blocks respectively and while the contacts 11 and 12 are constantly in wiping engagement the contacts 11 and 13 are spaced from each other when the circuit is in the break condition. This is distinguished from the position shown in Figs. 2 and 3 wherein the center contact 11 makes a circuit by being in simultaneous wiping engagement with both contacts 12 and 13.

Figure 2:
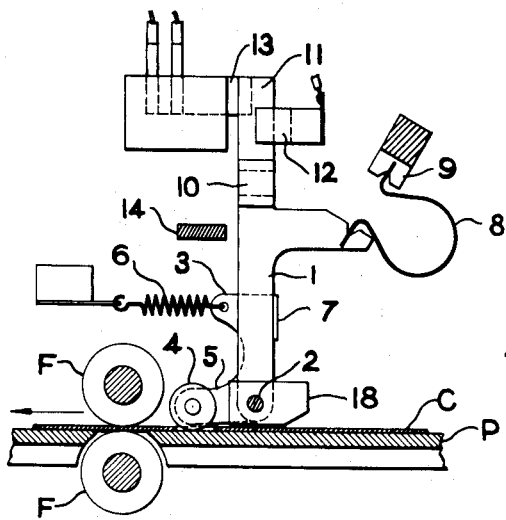
Fig. 2 is a view the same as Fig. 1 above, but here the sensing roll has encountered a perforation in a record card and the contacts are in engagement.
Figure 3:
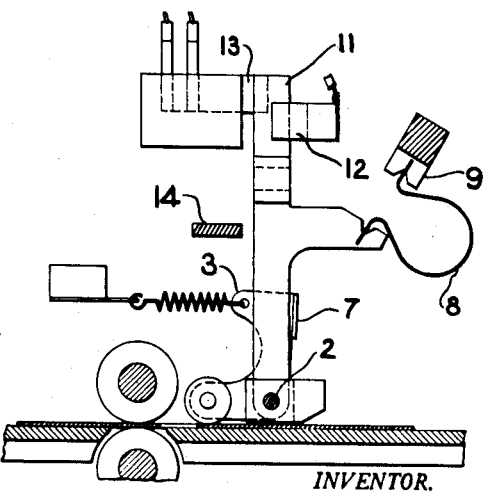
Fig. 3 shows the punched card and its perforation passing beyond the sensing roll while the sensing contacts remain in engagement.

A reset device or bail 14 constitutes a means whereby the sensing circuit being made, see Figs. 2 and 3, may be positively discontinued or broken at any desired position of the machine cycle. The bail 14 or retract bar is actuated in timed relation with the machine to abut or bear against the holder to positively move the same to the circuit break position shown in Figure 1. This movement is independent of the length of the perforation in the punched card and the period of time that the roll 4 remains in the perforation.

In operation, a perforated record card C is fed through the machine as by rollers F, the card being fed on a base plate P. The sensing member or bell crank 3 is yieldingly urged by spring 6 in the direction of the card so that any perforations which may pass thereunder will be encountered by the roll 4.

In the position of the mechanism as shown in Fig. 1 wherein the sensing contacts 11 and 13 are out of contact no current passes and therefore there is no sensing. However, when a card is fed through the machine and the roll 4 encounters a perforation the bell crank 3 moves counter-clockwise by virtue of spring 6 so that roll 4 may drop into the perforation to actuate the contact mechanism in the following manner.

As the bell crank 3 moves counter-clockwise the limiting device 7, which abuts the edge of the holder 1 in circuit breaking position, pivots the holder about rod 2. The pivoting of the holder from this first operative position to its second operative position wherein it makes a sensing circuit is opposed by the retaining force on the holder 1 by over-the-center spring 8. However, the opposition and retaining force of the spring 8 is so small that it is easily moved to its second operative position. In its second operative position the spring has moved from one over-center position to another. In this other or second over-center operative position the spring now yieldingly retains the holder 1 in sensing or contact making engagement. As can be seen in Fig. 2 the contact 11 now engages contacts 12 and 13 simultaneously, permitting the current to flow through the sensing circuit.

As the card C continues its movement through the machine the perforation passes beyond the roll 4 causing the bell crank 3 to pivot clockwise and moves the ear 7 away from holder 1, see Fig. 3. At this point it will be noted that despite the movement of the perforation entirely past the roll 4 the sensing circuit is permitted, as shown, to remain. The circuit may remain until reset bar 14 abuts against the holder 1 and positively moves the holder and the over-the-center retaining spring 8 back to their first position wherein the contact 11 is coincidentally moved out of engagement with contact 13 and the sensing circuit is broken.

The bail may be timed to remain in engagement with the holder after resetting it until bell crank 3 is moved clockwise again by the entrance of a new punched card under the sensing roll 4. The bail may be timed to break the circuit between the sensing contacts 11, 12 and 13 at any desired time and similarly may retain the holder 1 in this position as long as desired.

To facilitate accuracy, comb 16 has been provided to guide the movement of contacts 11 while a comb 18 has been provided to guide the movement of bell crank 3 and the lower portion of holder 1.

By the above novel structure and arrangement of elements it will be seen that the length of time of the sensing circuit may be varied independently of the length of time that it takes the perforation in a card to pass under the sensing mechanism. In fact it will be seen that the present invention provides novel means which may operate independently of a perforation in a punched card since the mechanism may obviously be actuated by means other than a perforation in a punched card.

What I claim is:

1. In a sensing device for a perforated record card, a contact member having movement between two positions, sensing means, means urging said sensing means to encounter the perforations in a record card, said sensing means having first actuating means cooperable with said contact member to move the same to one of said two positions when said sensing member encounters a perforation, second actuating means cooperable with said contact member to move the same to the other of said two positions, and means connected with said contact member to retain the same in either one or the other of said two positions until the same is moved by either one of said two actuating means.

2. In sensing device for a perforated record card; a holder mounted for oscillation between two positions, an oscillatable sensing member, yieldable means to oscillate said member relative to said holder and into sensing position, and yieldable means individual to said holder cooperating therewith to retain the same in either one of said two positions.

3. In sensing device for a perforated record card; a holder oscillatable about a pivot between two positions, a sensing member oscillatable about said pivot, over-the-center yieldable means individual to said holder for resiliently urging the same into either one of said two positions, and yieldable means individual to said member to urge said member into sensing position.

4. A sensing device for a perforated record card comprising a bell crank, a holder, a pivot about which said bell crank and holder have relative oscillations, a device to limit the amplitude of the oscillation of the bell crank relative to the holder, spring means normally holding the bell crank in sensing position, and an over-the-center spring cooperating with said holder to retain the same in one of two operative positions.

5. A sensing device for a perforated record card comprising a holder oscillatable about a pivot, a bell crank oscillatable about a pivot, means on said bell crank limiting the relative oscillations of the bell crank and the holder, spring means urging the bell crank to oscillate about its pivot, over-the-center means responsive to the oscillation of said bell crank to urge the holder from one operative position to a second operative position, and means cooperative with said over-the-center means to return it to said one operative position.

6. A sensing device for a perforated record card comprising an oscillatable sensing bell crank, an oscillatable holder, a pivot common to said bell crank and said holder, limiting means on said bell crank and said holder to limit their relative oscillations, over-the-center spring means operative to urge said holder into at least one of two operative positions, spring means constantly yieldingly urging said bell crank into sensing position to bear against the surface of a record card in which there may be perforations in line with said bell crank, said bell crank upon encountering a perforation, being urged therein by said spring means, whereupon said holder is oscillated by said limiting means from said one operative position in which said over-the-center means opposes said bell crank spring means to said second operative position of said holder and a second operative position of said over-the-center means wherein the over-the-center means yieldingly retains said holder in said second operative position even after the encountered perforation has passed beyond said bell crank, and reset means cooperating with said holder and over-the-center means to return said holder and said over-the-center means to their first operative positions and retain them in the first position independent of the movement of said sensing bell crank.

7. A sensing device for a perforated record card comprising a bell crank, a holder, a pivot about which said bell crank and holder have relative oscillations, a sensing means on said bell crank, a device to limit the amplitude of the oscillation of the bell crank relative to the holder, spring means normally holding the bell crank at one of its limits to urge the sensing means against a record card and in sensing position, a two position over-the-center spring cooperating with said holder to retain said holder in either one of two operative positions, and positive reset means cooperating with said holder operating on a predetermined variable timing to return and retain said holder in one of said two positions.

8. In a sensing device; a holder, a sensing member pivotable relative to said holder, means cooperating with said holder and said member to limit the relative pivoting, spring means urging said member toward and into any perforations in the cards which may pass thereunder, yieldable means for moving and yieldingly retaining said holder in one of two operative positions, a first contact on said holder, a second contact in wiping engagement with said first contact, a third contact spaced from said second contact and engageable by said first contact being common to said second and third contacts in one operative position and in wiping engagement with said second contact solely in another operative position.

9. The invention as in claim 8 in which said first contact is connected to said holder by an insulating block and is in constant circuit making engagement with said second contact, and predeterminately timed means to positively return said first contact from said one operative position to said other operative position, said contacts controlled to close when said sensing member encounters a perforation and to open when said timed means positively returns said first contact to said other position independently of the operation of said sensing member.

References Cited in the file of this patent

UNITED STATES PATENTS

| | | |
|---|---|---|
| 2,093,731 | La Boiteaux | Sept. 21, 1937 |
| 2,102,932 | Wilkinson | Dec. 21, 1937 |